(12) United States Patent
Strutt et al.

(10) Patent No.: US 12,411,754 B2
(45) Date of Patent: Sep. 9, 2025

(54) DEVICE PERFORMANCE MONITORING SYSTEM

(71) Applicant: Elliptic Laboratories ASA, Oslo (NO)

(72) Inventors: Guenael Thomas Strutt, San Francisco, CA (US); Steven Paul Lewis, Los Angeles, CA (US)

(73) Assignee: Elliptic Laboratories ASA, Oslo (NO)

( * ) Notice: Subject to any disclaimer, the term of this patent is extended or adjusted under 35 U.S.C. 154(b) by 79 days.

(21) Appl. No.: 18/283,542

(22) PCT Filed: Mar. 22, 2022

(86) PCT No.: PCT/EP2022/057423
§ 371 (c)(1),
(2) Date: Sep. 22, 2023

(87) PCT Pub. No.: WO2022/200309
PCT Pub. Date: Sep. 29, 2022

(65) Prior Publication Data
US 2024/0176725 A1    May 30, 2024

Related U.S. Application Data

(60) Provisional application No. 63/165,369, filed on Mar. 24, 2021.

(30) Foreign Application Priority Data

May 11, 2021 (NO) .................................. 20210589

(51) Int. Cl.
*G06F 11/00* (2006.01)
*G06F 11/30* (2006.01)
(Continued)

(52) U.S. Cl.
CPC ...... *G06F 11/3612* (2013.01); *G06F 11/3006* (2013.01); *G06F 11/3447* (2013.01)

(58) Field of Classification Search
CPC ............. G06F 11/3612; G06F 11/3006; G06F 11/3442; G06F 11/0793; G06F 11/079; G06F 11/3447
See application file for complete search history.

(56) References Cited

U.S. PATENT DOCUMENTS

| 10,162,693 | B1* | 12/2018 | Contino ............. G06F 11/0742 |
| 10,353,764 | B1* | 7/2019 | Cazzanti ............. G06F 11/0793 |
| 2023/0236927 | A1* | 7/2023 | Tang .................... G06F 11/0793 714/15 |

OTHER PUBLICATIONS

Lid, Eirik, "Sensor Fusion of Ultrasound and Motion Data for Gesture Recognition on Smartphones," Master of Science in Cybernetics and Robotics, Department of Engineering Cybernetics, Norwegian University of Science and Technology Jun. 2018 pp. 1-87. (Year: 2018).*

(Continued)

*Primary Examiner* — Joseph D Manoskey
(74) *Attorney, Agent, or Firm* — Bradley Arant Boult Cummings LLP

(57) ABSTRACT

The present invention is related to a system and corresponding method and computer implemented software for improving performance of at least one electronic devices, said devices including at least one sensors and a model defining the device reaction in response to data produced by at least one of said sensors. The system includes a model generator configured to analyze the data produced from said sensors and the reactions to the data, and register errors in the reactions as compared with the intended reactions, wherein the model generator is configured to adjust the device model by minimizing errors between the actual output of the model and the desired output of the model, based on a set of (Continued)

samples recorded on said at least one electronic devices, wherein the recorded samples include information related to which of a number of predefined states the device is in at the occurrence of the error, the time of the occurred error, and the number of errors at the specified time and/or state.

13 Claims, 3 Drawing Sheets

(51) Int. Cl.
  *G06F 11/34*    (2006.01)
  *G06F 11/3604*    (2025.01)

(56) References Cited

OTHER PUBLICATIONS

Patent Cooperation Treaty, International Application No. PCT/EP2022/057423, "International Search Report," Aug. 18, 2022, 2 pages.
Lid, Eirik, "Sensor Fusion of Ultrasound and Motion Data for Gesture Recognition on Smartphones," Master of Science in Cybernetics and Robotics, Department of Engineering Cybernetics, Norwegian University of Science and Technology, Jun. 2018, pp. 1-87.
Wang, Zhengjie et al., "Hand Gesture Recognition Based on Active Ultrasonic Sensing of Smartphone: A Survey," IEEE Access, vol. 7, Aug. 8, 2019, pp. 111897-111922, DOI: 10.1109/ACCESS.2019.2933987.
Zhang, Jie M. et al., "Machine Learning Testing: Survey, Landscapes and Horizons," arXiv:1906.10742, Jun. 19, 2019, Cornell University Library, Ithaca, NY, 37 pages.

* cited by examiner

DEVICE PERFORMANCE MONITORING SYSTEM

The present invention relates to a system and a method for analyzing the performance of a device.

Advanced electronic devices are often made for specific uses where adaptations have been made to the devices so as to handle realistic situations. This may include devices such as mobile phones or voice recognition devices where certain assumptions have been made in order to enhance the relevant signal and suppress other signals as background noise etc, or they may include automatic features being able to handle transitions between different modes of use. Although these parameters are chosen to be as realistic as possible there may be situations where the background noise or voice commands are different from the assumed realistic situations. While many electronic devices have systems for software updates it is difficult to obtain sufficiently good information about the devices performance and thus the updates may be insufficient.

Due to variations in device acoustic configurations, each device has to be manually tuned and calibrated to ensure consistent performance. Naturally, this is both a time-consuming and costly process. It is therefore an object of the present invention to simplify the process.

It is an object of the present invention to provide a system for improving the performance of electronics devices. This is obtained as described in the accompanying claims.

According to the invention the device is capable of submitting device specific information to a preferably cloud based platform and the platform is provided with certain product specifications. Based on this information the system is capable of generating a machine learning model through the use of machine learning techniques. The platform receives sampled performance information from the device, compares it with the specifications provided by the manufacturer, and then adjusts the model, which is fed back into the device as an update. This way the performance of the device may be adjusted by the platform through the use of machine learning procedures.

For example the device specific software may report on the measured ultrasound activity in the device environment. The specifications provided by the device manufacturer is based on an assumed activity which means that the device may not be sufficiently adapted to the real environment. For example the device may be adapted to handle a low number of devices using the same ultrasound measurements in the vicinity, but in some situations, like concerts, the background sound profile may be so different that the interference reduces the performance of the device.

Another example may be related to devices used for playback in smart speaker systems where the system should automatically switch to a different speaker when being moved into another zone. The reported error may be used to tune the characteristics of the software appliance to improve the transitions.

Yet another example is related to the change in screen, microphone and/or speaker performance and features when lifting a phone to the user's ear.

The device may then report measurements representing those instances, the analysis then concludes that changes in the device design has to be made and reports those back to the manufacturer.

The analysis is preferably performed in a cloud based system capable of communicating with the devices and both receive information from and report information to the manufacturer.

Another use of the present invention may be in devices such as mobile phones being controlled by gestures made by the user. By reporting measured deviations between the preprogrammed gestures to be interpreted by the device and the real movements of one or more specific users the system may be able to adapt to them.

The invention will be described more in detail below with reference to the accompanying drawings, illustrating the invention by way of examples.

Figure 1:
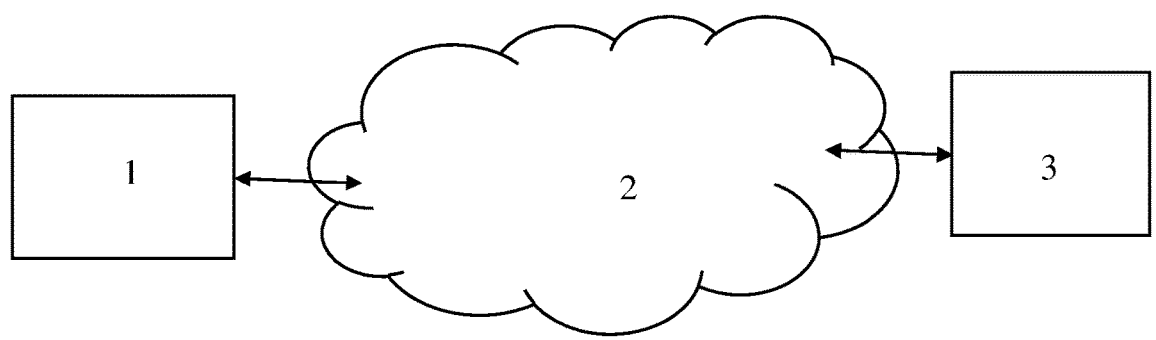
FIG. 1 illustrates a simplified version of the present invention.

As illustrated in FIG. 1 device manufacturers and application developers are allowed to utilize its presence and gesture sensing capabilities without the need to have expert knowledge of acoustics or signal processing. This may be performed through a cloud-based machine learning platform and uses advanced machine learning techniques to detect users' presence and estimate room occupancy, as well as provide gesture recognition.

The figure illustrates the architecture of the technology showing the device manufacturer 1 and a device 3, both communicating with a machine learning, preferably cloud based, service platform 2. Device manufacturers 1 merely need to define the operating environment of their product (e.g. its memory, storage, and computation capacities, as well as its power consumption, mechanical setup, and component characteristics) and select the performance they desire in terms of the software's range and sensitivity. The present invention then provides a software integration package specific to their devices, in addition to a set of machine learning classifiers provided by the system. Each classifier is a set of parameters used to map the reflected ultrasound signals to a set of categories (e.g. one nearby user, two nearby users, or the absence of a user). These classifiers require only a low amount of processing power, making them capable of running on any smart device.

Naturally, machine-learning classifiers require a large amount of device-specific data for maximal accuracy. This training is performed in a service platform 2, which hosts the data used to train the classifiers and provides updates based on any new information uploaded to the machine learning training centre. The cloud also includes advanced signal processing libraries (to pre-process the acoustic data and reduce the amount of memory and processing power needed for classification) as well as empirical data regarding hardware performance (i.e. an ultrasound recording database denoting the performance characteristics of various acoustic components, as well as any specific effects of their mechanical design). These libraries work in unison with each other to optimize overall system performance.

Once the system according to the invention is installed on a smart device or is configured to communicate with the system, its range, field of view, and performance can be further adjusted (either by the manufacturer or by the end user) through an Application Programming Interface (API). The device may also be able to optimize itself by correlating results with other input (such as tactical interaction) to determine the accuracy of a presence determination, essentially customizing the user's experience to the user's environment and improving its future responses.

The present invention provides a cloud-based platform containing machine learning algorithms, a recording database, and signal processing tools, which work together to reduce the deployment time needed for standard audio and acoustic configurations, rendering it more "plug-n-play".

Figure 2:
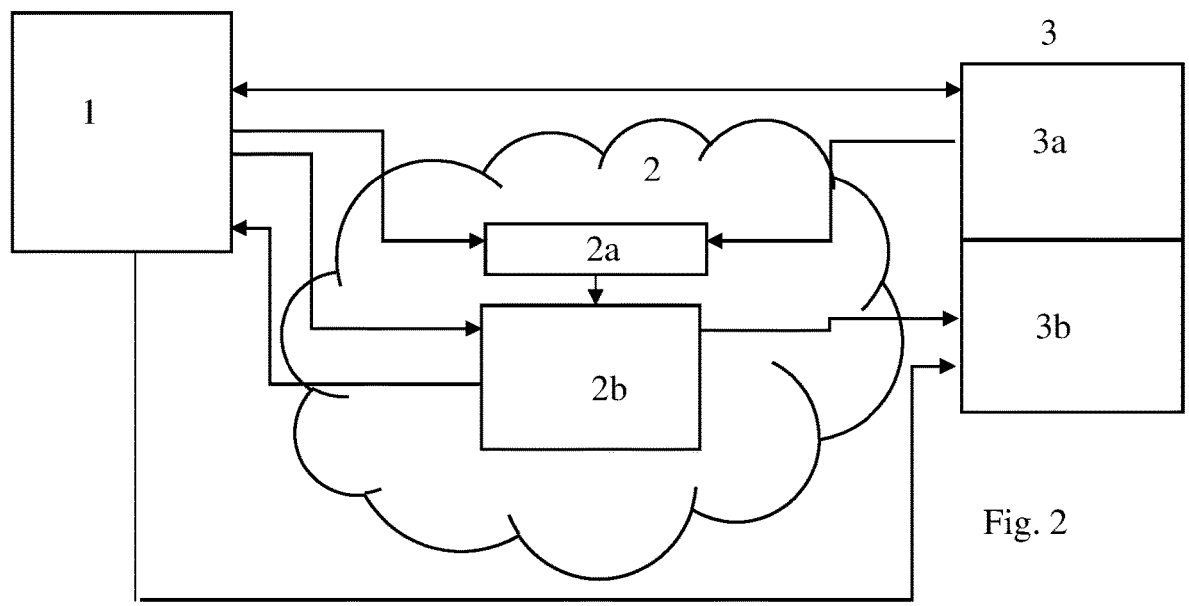
FIG. 2 illustrates a preferred embodiment of the invention more in detail.

In FIG. 2 a more detailed overview of the system is illustrated.

The manufacturer 1 initially provides the instructions to the system, of how the device should react to certain sensor outputs from the sensors included in the device 3. The manufacturer also provides the necessary computer codes, sensor characteristics and limits for the model adjustments to the machine learning system, as well as communication protocols for the machine learning system to communicate with the device. The manufacturer may provide predetermined limits for the model adjustments, and direct communication with the device for receiving data from the device, for example the same data communicated to the machine learning system for evaluation or development purposes.

The manufacturer 1 also provides the necessary information to the machine learning platform 2, including the models and adjustment possibilities within the range of these models, and the expected reactions to sensor outputs in the device. This also includes the necessary codes for communicating with each device.

The manufacturer 1 may also be able to receive the updated models from the machine learning service model generator 2b so as to evaluate the models in relation to the data received from the device 3.

Device 3 may comprise two different units 3a, 3b, including a software application 3a adapted to collect data from the device, and a processor/engine 3b. The recorded data may be from the sensors or from other performance measurements, e.g. by comparing different data types registered during the same situation, as well as user feedback received through a suitable user interface being related to the measurements or situation. These data are reported to a cloud based storage facility 2a for further processing and evaluation. In addition to the data received from the device 3 the storage facility 2a may also contain data collected from other similar devices under relevant conditions.

In addition to the measured data from the use of the device the engine or processor 3b in the device may also report the performance to the cloud based machine learning platform 2.

The engine 3b includes code for allowing integration of new models and parameters provided by the system which through the learning process of the system is aimed at improving the device performance in the specific operations.

The cloud based system 2 is adapted to use the information stored in the storage facility 2a as well as information regarding the model in the device, to build an updated model in the model generator 2b from the properties and performance of or reactions from the device as well as possibly information retrieved from similar devices received from the manufacturer. The resulting model may then be fed into the device engine 3b, e.g. as a software update, so as to adjust the performance of the device 3.

The model may also be simulated and reported back to the manufacturer 1 through a visual user interface, for further evaluation.

The system according to the invention may also provide testing means for the manufacturer 1 to send test cases to the device in order to check the performance of a device, e.g. for detecting software 3a or hardware 3b errors.

As stated above the cloud based system may be adapted to provide support service for different types of devices based on the engine code and control parameters from the device manufacturer database and data storage including data collected from the device 3 and measured data and performance provided by the device, both manufacturer and device being provided with interfaces for suitable communication interfaces for communicating with the system.

Monitoring these data provides a basis for machine learning as the system is capable of modelling and updating the performance of the device based on received new data from the devices as well as from the manufacturer. This may include adjusting the control parameters in the model relative to the initial parameters provided by the manufacturer so as to change the performance of the device by implementing the new model and parameters in the device engine or processor controlling the operation. As stated above this will provide a streamlined and cost-efficient way to improve the devices.

An example of the process is cited below where

Figure 3:
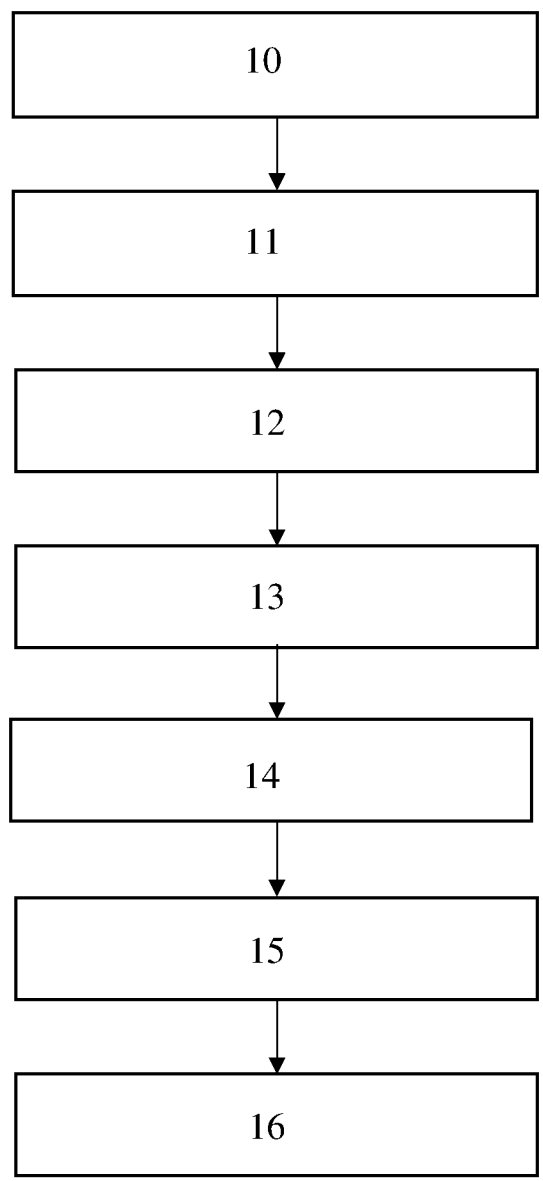
FIG. 3 illustrates the process steps in a machine learning sequence according to the invention.

A typical process according to the present invention as performed in the cloud based system 2 is illustrated in FIG. 3, comprising the following steps:

10 collecting data in the cloud storage from the device software 3a from any number of sensors in the device 3, the sensor types may be selected from e.g. cameras, acoustic sensors, inertial sensors, radar og optical measurements.

11. tagging the specifics of the tagged data such as data type, time, etc in said cloud data storage 2a.

12. Scrubbing the stored data using a manufacturer defined scrub routine.

13. Preprocessing the sampled data for modelling.

14. Based on the preprocessed data build a model representing the data.

15. Through an iteration process select the best model based on device performance.

16. Deploy the resulting, new model in the device.

The step of selecting models in step 15 may be performed by analyzing user statistics, registering user feedback or software rules such as comparison between expected performance under known situations and measured reactions. The step may also include measuring or selecting additional data, e.g. from other sensors.

Figure 4:
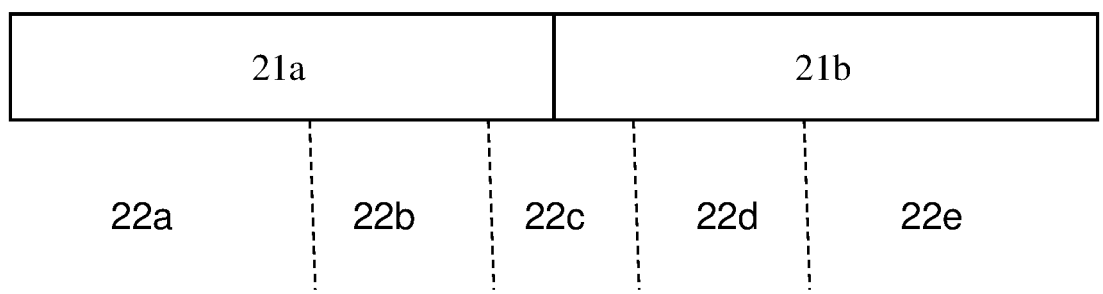
FIG. 4 illustrates a definition of recorded errors used by the system.

An example of how the data is used is illustrated in FIG. 4.

FIG. 4 illustrates the transition between two states 21a, 21B. These are different situations where the device should react in different ways, such as a phone user lifting the phone from the table and holding it toward the ear. In this case the phone could react by activating the speaker and microphone or deactivating the touch sensitivity of the screen. This could be achieved using the motion and orientation sensors in the phone.

In the state 21a the sensors should be capable of sensing the steady state period 22a situation where the phone is on the table with a high degree of certainty and a low probability of errors in reporting the state of the phone. Likewise an active use of the phone as in state 21b, such as holding it to the ear, will be in a steady state period 22e where the number of erroneous reports are low. However, during the process of lifting the phone to the ear there will be a transition period 22c where the sensors will have difficulties in reporting the correct state, and it is difficult to precisely tune the correct moment or position defining the transition. This transition period may have a known or predetermined length.

According to the present invention the shift from the first 21a to the second 21b state also includes a pre-transition state period 22b and post transition state period 22d. The pre- and post-transition states may be defined according to the distance to an assumed transition period 22c or a time before and after the transition state period 22c occurs. The specific times and distances will of course depend on the type of transition. Also, the pre- and post transition time and distances may be different before and after the transition period 22c. In the following the periods 22a-22e will also be called "slices".

Referring to the example above where the phone is lifted from the table toward the ear the transition may be defined at the moment the phone is in an essentially vertical position. The pre-transition time then being the time phones measures a movement until the assumed half way time and the post-transition represents the second half. In the pre- and post-transition periods the number of errors should be less, but the likelihood of them to be a real error is larger as the distance, e.g. in time and/(or position) to the assumed transition is larger.

When the steady, pre, post and transition states have been established the operational errors may be detected, either manually by the user or by analysing the signals, and predetermined error values may be determined. The error values may be of three different types subdivided based on their size and/or, duration, such as Error count (boolean)
- Error boolean (a detected error regardless of size/duration of error)
- Error boolean (error smaller than a predetermined size or shorter than a predetermined duration).
- Error boolean (error larger than a predetermined size or longer than a predetermined duration).

Error count (aggregate)
- Error counts (a detected error regardless of size/duration of error)
- Error counts (error smaller than a predetermined size or shorter than a predetermined duration).
- Error counts (error larger than a predetermined size or longer than a predetermined duration).

In addition the error type may be found, based on the state in which it occurs. These detected errors may then be used in the machine learning.

In addition to the error type the presence or position of an error inside a slice 22a-22e may be used to obtain information about the experienced error. For example the may be:
- at any point within a slice
- throughout the slice
- in the beginning of a slice
- at the end of a slice
- in the middle of a slice, independent of any errors at the beginning and the end.

Other combinations may also be defined, such as en error at the beginning of a slice but not at the middle or the end.

Based on these detected errors it is possible to define different situations, as in the following examples:

EXAMPLE 1

Technical Definition:
  Slice: Post-transition 22d from status 0 (no detection) to status 1 (detection).
  Error value: Boolean.
  Error type: An error throughout the slice.
Interpretation:
  the system did not detect the transition from status 0 to status 1 in a sufficient period of time.
May Indicate:
  Failure to detect Near when bringing phone to ear.
  When an area includes a number of defined and detect zones, failure to detect entrance into new zone when user is walking into a new zone, e.g. using a smart speaker system for playback from a device.

EXAMPLE 2

Technical Definition:
  Slice: Pre-transition 22b from status 0 (no detection) to status 1 (detection)
  Error value: duration
  Error type: There is an error at the end of the slice.
Interpretation:
  The system detected the transition from status 0 to status 1 a little early. How early is told by the duration.
Indicating:
  Duration of early detections when bringing the phone to the ear.

EXAMPLE 3

Technical Definition:
  Slice: Steady state 22a
  Error value: count.
  Error type: in the middle of the slice, independent of any error at the beginning and at the end.
Interpretation:
  The system lost its status 1 at least once, excluding late detections (the count only starts after status 1 is reached) and excluding early transitions (the count ignores a transition to another state if it occurs at the end of the slice. The error count provides the number.
Indicating:
  A phone lost a function several times, such as flickering during a call.
  Using playback from a smart speaker device the playback jumps to other zones while staying inside a zone.

Based on a number of error messages and registered data about the error occurrences stored in the cloud based storage system 2a and the model 2b with related parameters in the cloud based system provided by the manufacturer database, the machine based learning is adapted to, in a simulation and evaluation process, propose and compare models in order to find the models and related parameters most likely to reduce the number of errors. This way, for example, if a significant number of errors are registered as the phone switching mode to late when liftet to the ear the model may be adjusted so as to switching earlier if a corresponding movement is registered.

The chosen model is then transmitted to the manufacturer for evaluation. This way the manufacturer is provided with a new model being adjusted according to real life use of the device resulting in an improved performance under changing conditions.

Based on the models the manufacturer may use hardware or software tests transmitted to the device software application 3a and/or hardware 3b, or reprogram the device by hardware or firmware according to the new model.

One aspect of the present invention may thus be summarized as providing a computer system and corresponding method for optimizing a device performance, the system including a data storage, where the data storage is adapted to receive predetermined information relating to the device processor performance and data collected from sensors in the device, such as acoustic detectors, movement sensors etc being indicative of the device use and performance under realistic conditions.

More specifically it relates to a computer system for improving performance of at least one electronic devices. The devices include sensors and software sampling predetermined information related to selected operations performed with said device and a predetermined model specifying the device reactions in predetermined situations. The sensors may include such measurements as cameras, acoustic sensors, inertial sensors, radar og optical measurements. The model is initially provided by the manufacturer specifying the planned performance of the device under specific conditions.

The computer system is also being configured to receiving and storing said sampled information from said device as well as device information related to said devices from a manufacturer, the information including said model.

The information sampled by the device also includes reported errors and/or deviations from said model performance related to said sampled information. The errors may be detected by the device software or reported by the user through a suitable interface.

The computer system is adapted to generate an adjusted model based on said reported errors and measurements by said sensors as well as the previous model, and generating an updated model based on deviations between the initial model and the measured performance. The updated model is transmitted to the device(s) and may also be reported to the manufacturer which may reprogram and/or test the performance of the model further before updating and testing at the device through firmware or software, e.g. app, updates.

The sampled information is preferably tagged with data type, time and/or position tags in order to secure the relationship between the sampled and reported information.

In order to analyse the error detections and related measurements in the sampled information the system may use a predetermined set of rules, which the system is configured to iteratively reconfigure the model so as to reduce the number of error detections.

The predetermined set of rules may include the classification of errors according to predetermined stable and transition states, as well as pre and post transition states, said iteration being configured to reduce the errors in the stable, pre and post transition states.

Preferably the computer system is a cloud based computer system comprising a data storage for receiving measured data from the device and information related to the device performance characteristics, a model generator for based on the initial model provided by the manufacturer and the data stored in the data storage generating an adjusted model, and a model evaluation unit for evaluating the generated model and transmitting the model to the manufacturer.

The evaluation unit and model generator iteratively regenerate and evaluate the model for generating an improved model.

The method and computer implemented software according to the invention include the following steps:
  in at least one device, sampling information related to error detections and measurements related to said error detections, the detections including reports from the users or errors detected by the device software,
  in said computer network, receiving said information sampled by said device, the network also including storage means including information related to the device software and performance, as well as a model specifying the device performance
  in the network, adjusting the model based on the reported errors and related measurements,
  transmitting the adjusted model to said device, said device updating the software to correspond with the adjusted model.

According to another aspect the invention relates to a system for improving performance of at least one electronic device, where the devices include at least one sensor and a model defining the device reaction in response to data produced by the at least one sensor.

The system includes a model generator configured to analyse the data produced from the sensors and the reactions to the data, where the reactions may be based on analysis of the performance of the device under the measured conditions or can be provided through a used interface. Register errors in the reactions as compared with the intended reactions according to the model.

The model generator is configured to adjust the device model by minimizing errors between the actual output of the model and the desired output of the model, based on a set of samples recorded on said at least one electronic devices.

The recorded samples include information related to
  which of a number of predefined states the device is in at the occurrence of the error,
  the time of the occurred error, and
  the number of errors at the specified time and/or state.

The predefined states are preferably related to transition situation and include a steady state, a pre-transition state, a transition state, and a post-transitions state.

The specific times preferably include the beginning of a state, the middle of a state, the end of a state, the entirety of a state, or a combination thereof, thus for example defining duration of a pretransition state and/or the time during the state the reaction is referred to.

The count of errors thus may include a boolean count, and aggregate count, or a duration ratio.

The model generator is preferably a network system communicating with a number of devices where the generator may also also be adapted to communicate with the manufacturer, being provided with an initial model and expected performance of the device and the device may be provided with a user interface configured to receive error reports from a device user.

The errors may be registered at a measured deviation between the expected reaction of the device and the measured reaction or may be reported through a user interface configured to received reactions from the user, e.g. reporting deviations from the intended operation model.

The system may be configured to analyse the error detections and related measurements in the sampled data based on a predetermined set of rules, the system being configured to iteratively reconfigure the model so as to reduce the number of error detections, either based on a compiled set of reactions or continuously based on a set constituted by a number of last received reactions.

The sensors in the device may include at least one of the following: cameras, acoustic sensors, inertial sensors, radar or optical measurements and the analysis of the performance of the device may be based on one or more of said sensors during the state change.

Yet another aspect of the invention is related to a method for improving the performance of a device of a specific type, comprising the following steps:
  in at least one device, sampling information related to error detections and measurements related to said error detections, the detections including reports from the users or errors detected by the device software,
  in model generator, receiving said information sampled by said device, the generator also including storage means including information related to the device software and performance, as well as a model specifying the device performance in the generator, adjusting the model based on the reported errors and related measurements, transmitting the adjusted model to said device, said device updating the software to correspond with the adjusted model, and.

wherein the model generator adjusts the device model by minimizing errors between the actual output of the model and the desired output of the model, based on a set of samples recorded on said at least one electronic devices, wherein the recorded samples include information related to which of a number of predefined states the device is in at the occurrence of the error, the time of the occurred error, and the number of errors at the specified time and/or state.

The predefined states are preferably related to transition and include a steady state, a pre-transition state, a transition state, and a post-transitions state.

The specific times preferably include the beginning of a state, the middle of a state, the end of a state, the entirety of a state, or a combination thereof, and the count of errors includes a boolean count, and aggregate count, or a duration ratio.

The invention claimed is:

1. A system for improving performance of at least one electronic device, the at least one electronic device comprising at least one sensor and a model defining device reaction in response to data produced by at least one of the at least one sensor, the system comprising:
   a model generator configured to analyze the data produced from the at least one sensor and the reactions to the data and register errors in the reactions as compared with intended reactions;
   wherein the model generator is configured to adjust the device model by minimizing errors between an actual output of the model and a desired output of the model, based on a set of samples recorded on at least one of the at least one electronic device;
   wherein the recorded samples include information related to:
      which of a number of predefined states a device is in at the occurrence of the error;
      the time of the occurred error; and
      the number of errors at at least one of a specified time and state; and
   wherein the predefined states are related to transition and include a steady state, a pre-transition state, a transition state, and a post-transitions state.

2. The system according to claim 1, wherein the model generator is a network system communicating with a number of devices.

3. The system according to claim 1, wherein the device is provided with a user interface configured to receive error reports from a device user.

4. The system according to claim 1, wherein the errors are registered at a measured deviation between the expected reaction of the device and the measured reaction.

5. The system according to claim 1, being configured to analyze the error detections and related measurements in the sampled data based on a predetermined set of rules, the system being configured to iteratively reconfigure the model so as to reduce the number of error detections.

6. The system according to claim 1, wherein the sensors include at least one of the following: cameras, acoustic sensors, inertial sensors, radar or optical measurements.

7. A system for improving performance of at least one electronic device, the at least one electronic device comprising at least one sensor and a model defining device reaction in response to data produced by at least one of the at least one sensor, the system comprising:
   a model generator configured to analyze the data produced from the at least one sensor and the reactions to the data and register errors in the reactions as compared with intended reactions;
   wherein the model generator is configured to adjust the device model by minimizing errors between an actual output of the model and a desired output of the model, based on a set of samples recorded on at least one of the at least one electronic device;
   wherein the recorded samples include information related to:
      which of a number of predefined states a device is in at the occurrence of the error;
      the time of the occurred error; and
      the number of errors at at least one of a specified time and state; and
   wherein the specific times include the beginning of a state, the middle of a state, the end of a state, the entirety of a state, or a combination thereof.

8. A system for improving performance of at least one electronic device, the at least one electronic device comprising at least one sensor and a model defining device reaction in response to data produced by at least one of the at least one sensor, the system comprising:
   a model generator configured to analyze the data produced from the at least one sensor and the reactions to the data and register errors in the reactions as compared with intended reactions;
   wherein the model generator is configured to adjust the device model by minimizing errors between an actual output of the model and a desired output of the model, based on a set of samples recorded on at least one of the at least one electronic device;
   wherein the recorded samples include information related to:
      which of a number of predefined states a device is in at the occurrence of the error;
      the time of the occurred error; and
      the number of errors at at least one of a specified time and state; and
   wherein the count of errors includes a boolean count, and aggregate count, or a duration ratio.

9. A system for improving performance of at least one electronic device, the at least one electronic device comprising at least one sensor and a model defining device reaction in response to data produced by at least one of the at least one sensor, the system comprising:
   a model generator configured to analyze the data produced from the at least one sensor and the reactions to the data and register errors in the reactions as compared with intended reactions;
   wherein the model generator is configured to adjust the device model by minimizing errors between an actual output of the model and a desired output of the model, based on a set of samples recorded on at least one of the at least one electronic device;
   wherein the recorded samples include information related to:

which of a number of predefined states a device is in at the occurrence of the error;
the time of the occurred error; and
the number of errors at at least one of a specified time and state;
wherein the model generator is a network system communicating with a number of devices; and
wherein the generator is also adapted to communicate with the manufacturer, being provided with an initial model and expected performance of the device.

10. A method for improving the performance of a device of a specific type, the method comprising:
in at least one device, sampling information related to error detections and measurements related to the error detections, the error detections including reports from users or errors detected by device software;
in model generator, receiving the information sampled by the device, the model generator also including storage means including information related to the device software and performance, as well as a model specifying the device performance;
in the generator, adjusting the model based on the reported errors and related measurements;
transmitting the adjusted model to the device, the device updating the device software to correspond with the adjusted model; and
wherein the model generator adjusts the device model by minimizing errors between the actual output of the model and the desired output of the model, based on a set of samples recorded on the at least one electronic devices, wherein the recorded samples include information related to:
which of a number of predefined states the device is in at the occurrence of the error;
the time of the occurred error; and
the number of errors at at least one of the specified time and state; and
wherein the predefined states are related to transition and include a steady state, a pre-transition state, a transition state, and a post-transitions state.

11. A method for improving the performance of a device of a specific type, the method comprising:
in at least one device, sampling information related to error detections and measurements related to the error detections, the error detections including reports from users or errors detected by device software;
in model generator, receiving the information sampled by the device, the model generator also including storage means including information related to the device software and performance, as well as a model specifying the device performance;
in the generator, adjusting the model based on the reported errors and related measurements;
transmitting the adjusted model to the device, the device updating the device software to correspond with the adjusted model;
wherein the model generator adjusts the device model by minimizing errors between the actual output of the model and the desired output of the model, based on a set of samples recorded on the at least one electronic devices, wherein the recorded samples include information related to:
which of a number of predefined states the device is in at the occurrence of the error,
the time of the occurred error, and
the number of errors at at least one of the specified time and state; and
wherein the specific times include the beginning of a state, the middle of a state, the end of a state, the entirety of a state, or a combination thereof.

12. A method for improving the performance of a device of a specific type, the method comprising:
in at least one device, sampling information related to error detections and measurements related to the error detections, the error detections including reports from users or errors detected by device software;
in model generator, receiving the information sampled by the device, the model generator also including storage means including information related to the device software and performance, as well as a model specifying the device performance;
in the generator, adjusting the model based on the reported errors and related measurements;
transmitting the adjusted model to the device, the device updating the device software to correspond with the adjusted model;
wherein the model generator adjusts the device model by minimizing errors between the actual output of the model and the desired output of the model, based on a set of samples recorded on the at least one electronic devices, wherein the recorded samples include information related to:
which of a number of predefined states the device is in at the occurrence of the error,
the time of the occurred error, and
the number of errors at at least one of the specified time and state; and
wherein the count of errors includes a boolean count, and aggregate count, or a duration ratio.

13. A computer-program product comprising a non-transitory computer-usable medium having computer-readable program code embodied therein, the computer-readable program code adapted to be executed to implement the method of claim 10.

* * * * *